Patented Apr. 22, 1930

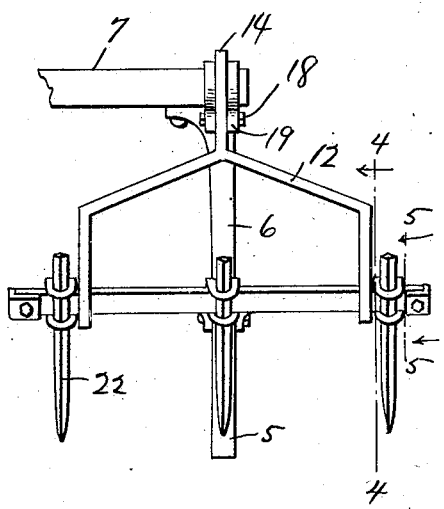
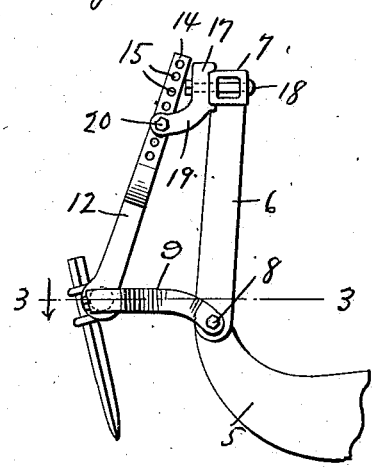
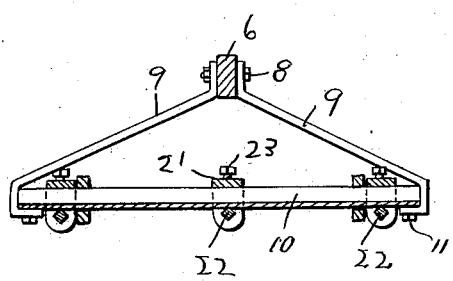
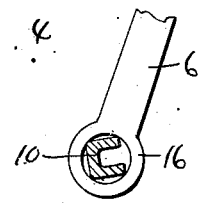
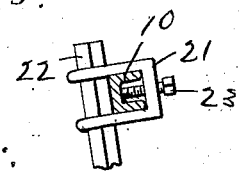
Inventor
Carl Rosen

1,755,271

UNITED STATES PATENT OFFICE

CARL ROSEN, OF MEDIA, ILLINOIS

PULVERIZER ATTACHMENT FOR CORN PLANTERS

Application filed March 17, 1928. Serial No. 262,429.

The present invention relates to a cultivator attachment for corn planters and the advantages and objects thereof will appear from a consideration of the accompanying drawings, taken with the following detailed description.

In the drawing:

Figure 1 is a front elevation of the attachment showing the same mounted at the front end of the corn planter runner.

Figure 2 is a side elevation thereof.

Figure 3 is a horizontal section therethrough taken substantially on the line 3—3 of Figure 2.

Figure 4 is a vertical section taken substantially on the line 4—4 of Figure 1, and Figure 5 is a vertical section taken substantially on the line 5—5 of Figure 1.

Referring to the drawing in detail, it will be seen that the numeral 5 denotes the front upwardly curved end of a conventional corn planter runner, which has a link 6 extending upwardly therefrom and secured to the cross beam 7. These parts of the planter have been disclosed merely for the purpose of showing the manner in which the attachment is mounted.

A bolt 8 holds a pair of arms 9, to the lower portion of the link 6, and these arms diverge forwardly from each other with their terminals extended about the ends of a channel iron beam 10 and fixed thereto as at 11.

A yoke 12 is formed on a bar 14, which is provided with a plurality of openings 15. The ends of the yoke 12 are in the form of eyes 16, through which project the channel iron beam 10. A bracket 17 is fixed to the beam 7 by a bolt 18, and has an arm 19 with bifurcated extremities straddling the bar 14 and the bolt 20 extends through openings in the bifurcated extremities and through one of the openings 15.

A plurality of U-shaped clamp members 21 are mounted on the beam 10 one adjacent each end thereof and one at the center thereof. These U-shaped members have apertured extremities through which extend the upper portion of teeth 22, and set screws 23 are threaded through the bights of the clamp members 21, to engage the bottom of the channel and the channel iron beam 10 and to draw the teeth into binding and frictional engagement with the beam.

The adjustment afforded by the openings 15 and the bolt 20 controls the angles at which the teeth will extend to the drums as will be quite apparent.

As shown and described, this attachment 6 directly in front of the planter runner may be adjusted for angle or depth as explained. The teeth pulverize the soil directly in front of the runner, thereby leaving the soil in a pulverized condition, which will cause it to have the effect of holding moisture. The teeth break up clods and harrow out weeds. The teeth break up crusts, leaving loose dirt to cover the corn.

Also, these teeth fill up horse tracks and loose dirt, better enabling the farmer to cover all of the corn so as to insure an evener and better stand, because as a rule, a certain percentage of the corn which drops in the horse tracks is not covered and does not grow or is eaten by birds and the like. This attachment enables corn to be planted shallower than ordinarily, if desired, because the ground is more level in front of the runner, whereby the planter need not be run so deep in the loose ground to insure covering of the corn sufficiently in small valleys or holes.

It will be further seen that the structure is exceedingly simple in its construction, strong and durable, easy to adjust, and thoroughly efficient for carrying out the purposes mentioned.

The present embodiment of the attachment has been disclosed in considerable detail, merely for the purpose of exemplification, because in actual practice, it attains the features of advantage enumerated in the above detailed description.

It will be apparent that changes in the details of construction and in the combination and arrangement of parts may be resorted to, without departing from the spirit and scope of the invention as hereinafter claimed or sacrificing any of its advantages.

Having thus described my invention, what I claim as new is:

A pulverizer attachment for corn planters wherein the planter includes a runner, a link projecting upwardly from the forward end of the runner, and a cross beam at the upper end of the link comprising a beam, a plurality of teeth, means for attaching the teeth to the last mentioned beam, a bracket on the first mentioned beam, a yoke having openings in its extremities, through which the second mentioned beam extends, arms engaged with the bottom of the link and the ends of the second mentioned beam, a bar extending from the yoke, means for adjusting the connection of the bar with the bracket, said means attaching the teeth and second mentioned beam comprising U-shaped clamp members having apertured extremities through which the teeth extend, and a set screw threaded through the bights of the U-shaped clamp members to engage on the second mentioned beam to hold the teeth tightly against said second mentioned beam.

In testimony whereof I affix my signature.

CARL ROSEN.